(12) United States Patent
Huang

(10) Patent No.: US 11,616,275 B2
(45) Date of Patent: Mar. 28, 2023

(54) CONNECTING ASSEMBLY, BATTERY MODULE, BATTERY PACK, DEVICE, AND MANUFACTURING METHOD

(71) Applicant: Contemporary Amperex Technology Co., Limited, Ningde (CN)

(72) Inventor: Xiangbin Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/624,338

(22) PCT Filed: Oct. 29, 2020

(86) PCT No.: PCT/CN2020/124948
§ 371 (c)(1),
(2) Date: Dec. 31, 2021

(87) PCT Pub. No.: WO2021/129136
PCT Pub. Date: Jul. 1, 2021

(65) Prior Publication Data
US 2022/0209368 A1      Jun. 30, 2022

(30) Foreign Application Priority Data

Dec. 27, 2019   (CN) .......................... 201911381409.1

(51) Int. Cl.
*H01M 50/50*        (2021.01)
*H01M 50/51*        (2021.01)
(Continued)

(52) U.S. Cl.
CPC ....... *H01M 50/507* (2021.01); *H01M 10/425* (2013.01); *H01M 50/209* (2021.01);
(Continued)

(58) Field of Classification Search
CPC ............. H01M 50/209; H01M 50/521; H01M 50/519; H01M 50/507
See application file for complete search history.

(56) References Cited

U.S. PATENT DOCUMENTS

| 2016/0036028 A1* | 2/2016 | Tsuruta | ................ | H01M 50/55 |
|---|---|---|---|---|
| | | | | 429/121 |
| 2019/0027731 A1* | 1/2019 | Zeng | .................... | H01M 50/543 |

FOREIGN PATENT DOCUMENTS

| CN | 104466072 A | 3/2015 |
|---|---|---|
| CN | 105322123 A | 2/2016 |

(Continued)

OTHER PUBLICATIONS

Contemporary Amperex Technology Co., Limited, International Search Report with English Translation, PCT/CN2020/124948, dated Jan. 27, 2021, 6 pgs.

(Continued)

*Primary Examiner* — Ula C Ruddock
*Assistant Examiner* — Frank A Chernow
(74) *Attorney, Agent, or Firm* — Kilpatrick Townsend & Stockton LLP

(57) ABSTRACT

This application provides a connecting assembly, a battery module, a battery pack, a device, and a manufacturing method. The connecting assembly includes an insulation board and a busbar. The insulation board includes a hollow portion, a first side, and a second side. The busbar includes a first busbar and a second busbar. The first busbar is disposed on the first side of the insulation board. The second busbar is disposed from the second side into the hollow portion of the insulation board. The battery module includes a battery cell and a module frame. The battery cell is accommodated in the module frame. A device using a battery cell as a power supply includes: a power source (Continued)

configured to provide a driving force for the device; and a battery module configured to provide electrical energy to the power source.

8 Claims, 6 Drawing Sheets

(51) Int. Cl.
*H01M 50/507* (2021.01)
*H01M 50/519* (2021.01)
*H01M 50/521* (2021.01)
*H01M 50/209* (2021.01)
*H01M 10/42* (2006.01)

(52) U.S. Cl.
CPC ....... *H01M 50/519* (2021.01); *H01M 50/521* (2021.01); *H01M 2220/20* (2013.01)

(56) References Cited

FOREIGN PATENT DOCUMENTS

| | | |
|---|---|---|
| CN | 107403889 A | 11/2017 |
| CN | 107958984 A | 4/2018 |
| CN | 207834415 U | 9/2018 |
| CN | 208256764 U | 12/2018 |
| CN | 109273653 A | 1/2019 |
| CN | 109301634 A | 2/2019 |
| CN | 109728237 A | 5/2019 |
| CN | 109860495 A | 6/2019 |
| DE | 102012213673 A1 | 2/2014 |
| JP | 2010097722 A | 4/2010 |
| KR | 20180039526 A | 4/2018 |
| WO | 2013084941 A1 | 6/2013 |
| WO | 2014019772 A1 | 2/2014 |
| WO | 2019132291 A1 | 7/2019 |

OTHER PUBLICATIONS

Contemporary Amperex Technology Co., Limited, CN First Office Action with English Translation, CN 201911381409.1, dated Jun. 8, 2021, 16 pgs.
The second Office Action received in the corresponding CN Application 201911381409.1.
The Notification to Grant Patent Right for Invention received in the corresponding CN Application 201911381409.1.
Written Opinion received in the corresponding International Application PCT/CN2020/124948.
The first search result received in the corresponding CN Application 201911381409.1.
The extended European search report received in the corresponding European Application 20907137.2, dated May 13, 2022.
The first Office Action received in the corresponding European Application 20907137.2, dated Aug. 24, 2022.
The second Office Action received in the corresponding European Application 20907137.2, dated Feb. 3, 2023.

* cited by examiner

CONNECTING ASSEMBLY, BATTERY MODULE, BATTERY PACK, DEVICE, AND MANUFACTURING METHOD

CROSS-REFERENCE TO RELATED APPLICATIONS

This application is a United States National Stage Application filed under 35 U.S.C. § 371 of PCT Patent Application Serial No. PCT/CN2020/124948, entitled "CONNECTING ASSEMBLY, BATTERY MODULE, BATTERY PACK, DEVICE, AND MANUFACTURING METHOD," filed Oct. 29, 2020, which claims priority to Chinese Patent Application No. 201911381409.1, filed on Dec. 27, 2019 and entitled "CONNECTING ASSEMBLY, BATTERY MODULE, BATTERY PACK, DEVICE, AND MANUFACTURING METHOD", each of which is incorporated herein by reference in its entirety.

TECHNICAL FIELD

This application relates to the technical field of energy storage devices, and in particular, to a connecting assembly, a battery module, a battery pack, a device, and a manufacturing method.

BACKGROUND

With the development of new energy technology, battery modules and battery packs are applied more widely. A battery module or battery pack is used to supply power to a power source of, for example, a new energy vehicle. Taking a battery module as an example, the battery module generally includes a module frame and battery cells. The battery cells are accommodated in the module frame.

A connecting assembly is disposed in the battery module. The connecting assembly typically consists of a busbar and an insulation board. The insulation board is configured to fix the position of the busbar so that the connecting assembly is easy to transport and install. The busbar implements electrical connection between the battery cells in the battery module. However, in some circumstances, the connecting assembly is hardly shockproof and likely to shake.

SUMMARY

Embodiments of this application provide a connecting assembly, a battery module, a battery pack, a device, and a manufacturing method to mitigate the problem that a busbar is hardly shockproof and is likely to shake.

An embodiment of this application provides a connecting assembly, applicable to a battery module and including:

an insulation board, where insulation board includes a hollow portion, a first side, and a second side; and a busbar, where the busbar includes a first busbar and a second busbar.

The first busbar is disposed on the first side of the insulation board.

The second busbar is disposed from the second side into the hollow portion of the insulation board.

In some embodiments, the connecting assembly further includes a circuit board disposed on the first side. The circuit board is connected to a plurality of sampling pins, and the plurality of sampling pins are indirectly connected to the second busbar and the first busbar respectively.

In some embodiments, the connecting assembly further includes a connecting piece. At least a part of the connecting piece is embedded into insulation board. The second busbar is connected to the sampling pins by the connecting piece. The connecting piece connects the second busbar to the sampling pins, thereby solving the problem of inability of sampling a remote busbar and ensuring proper risk control during the sampling.

In some embodiments, the connecting piece includes a first extension, an inset, and a second extension. The inset is connected to the first extension and the second extension, and is embedded in the insulation board. The first extension is located in the hollow portion. The first extension is connected to a surface of the second busbar, the surface being close to the first side. The connecting piece is fixed to the insulation board by the inset, and is connected to the second busbar and the sampling pins through the first extension and the second extension respectively in one-to-one correspondence, so as to ensure a reliable connection between the circuit board and the second busbar and sample the second busbar.

In some embodiments, a first snap-fit portion and a first prop are disposed in the hollow portion. The first snap-fit portion is located in the hollow portion away from the first side, and the first prop is located in the hollow portion near the first side.

The second busbar is located between the first snap-fit portion and the first prop. In this way, the second busbar is fixed to the insulation board by the first snap-fit portion and the first prop, thereby preventing the second busbar from falling off from the insulation board.

In some embodiments, a recess is disposed on the second busbar.

The first prop abuts against the recess.

In some embodiments, a side of the first snap-fit portion, the side that is away from the second busbar in a thickness direction of the insulation board, is a sloping side. The sloping side makes it easier to install the second busbar from bottom to top along the thickness direction of the insulation board, and reduces the difficulty of installing the second busbar.

In some embodiments, a communicating hole, a second snap-fit portion, and a second prop are disposed on the insulation board. The second prop partitions the hollow portion to form a plurality of communicating holes, and the second snap-fit portion is disposed on the first side.

The first busbar is located between the second snap-fit portion and the second prop.

An embodiment of this application further provides a battery module, including a battery cell and a module frame. The battery cell is accommodated in the module frame.

The battery module further includes a connecting assembly.

The connecting assembly is connected to an electrode lead of the battery cell by the busbar.

An embodiment of this application further provides a battery pack, including a box body and a battery module.

An embodiment of this application further provides a device using a battery cell as a power supply. The device includes: a power source configured to provide a driving force for the device; and a battery module configured to provide electrical energy to the power source.

An embodiment of this application further provides a method for manufacturing a connecting assembly, including:

installing a first busbar onto a first side of an insulation board from top to bottom in a thickness direction of the insulation board; and installing a second busbar into a hollow portion of the insulation board from bottom to top in the thickness direction of the insulation board.

In some embodiments, the manufacturing method further includes: connecting the connecting piece to the sampling pins of the circuit board;

fixing a circuit board equipped with the sampling pins to a first side of the insulation board; and connecting the first busbar to a part of the sampling pins.

In some embodiments, the manufacturing method further includes:

embedding a connecting piece into the insulation board to form an inset, a first extension, and a second extension;

connecting the second busbar to the first extension; and connecting another part of the sampling pins to the second extension.

The technical solutions provided in this application achieve the following beneficial effects:

The connecting assembly according to this application includes the busbar and the insulation board. The insulation board includes the hollow portion and the first side. The busbar includes the first busbar and the second busbar. The first busbar is installed on the first side of the insulation board from top to bottom, and the second busbar is installed in the hollow portion of the insulation board from bottom to top, and is connected to the sidewall of the hollow portion. Because the first busbar and the second busbar are disposed on different sides, an acting force on the first busbar counteracts an acting force on the second busbar, thereby reducing the shake of the assembly. Compared with the arrangement in which the first busbar and the second busbar are on the same side, the arrangement in this application has the advantage of being more shockproof.

A battery module provided in this application includes a connecting assembly. The connecting assembly is connected to the electrode lead of the battery cell by the busbar. The battery module adopts the foregoing connecting assembly, and therefore, has the advantage of being more shockproof.

A battery pack provided in this application contains a battery module. The battery pack adopts the foregoing battery module, and therefore, has the advantage of being more shockproof.

An embodiment of this application further provides a device using a battery cell as a power supply, and the device includes a battery module. The device adopts the foregoing battery module, and therefore, has the advantage of being more shockproof.

A method for manufacturing a connecting assembly according to this application includes: installing a first busbar onto a first side of an insulation board from top to bottom in a thickness direction of the insulation board; and installing a second busbar into a hollow portion of the insulation board from bottom to top. Because the first busbar and the second busbar are disposed on different sides, an acting force on the first busbar counteracts an acting force on the second busbar, thereby reducing the shake of the assembly. Compared with the arrangement in which the first busbar and the second busbar are on the same side, the arrangement in this application has the advantage of being more shockproof.

Understandably, the above general description and the following detailed description are merely exemplary without limiting this application.

BRIEF DESCRIPTION OF DRAWINGS

To describe the technical solutions in the embodiments of this application more clearly, the following outlines the drawings used in the embodiments of this application. Apparently, the drawings outlined below are merely a part of embodiments of this application. A person of ordinary skill in the art may derive other drawings from the outlined drawings without making any creative efforts.

Figure 1:
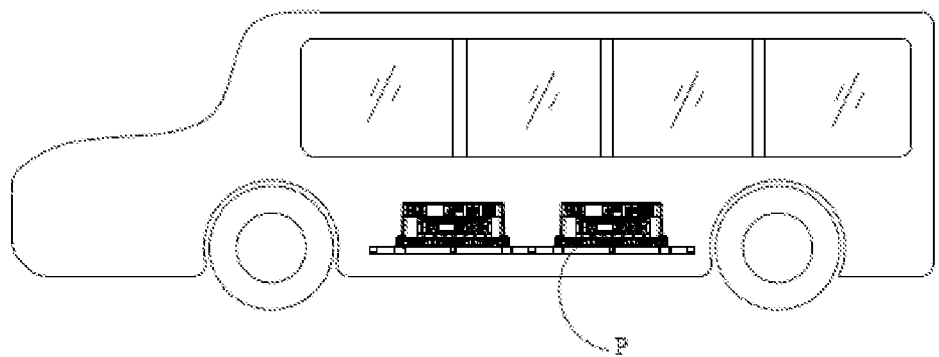
FIG. 1 is a schematic structural diagram of a device using a battery cell as a power supply according to an embodiment of this application.

The drawings are not drawn to scale.

REFERENCE NUMERALS

P—Battery pack;
M—Battery module;
1—Connecting assembly;
11—Insulation board;
111—Hollow portion;
112—First side;
113—Second side;
114—First snap-fit portion;
115—First prop;
116—Communicating hole;
117—Second snap-fit portion;
118—Second prop;
12—Busbar;
121—Second busbar;
121a—Recess;
122—First busbar;
122a—First busbar body;
122b—Busbar extension;
13—Circuit board;
131—Sampling pin;
14—Connecting piece;
141—First extension;
142—Second extension;
2—Module frame;
21—End plate;

22—Side plate;
3—Battery cell;
31—Electrode lead
4—Upper cover plate;
5—Box body;
51—Upper box body; and
52—Lower box body.

DETAILED DESCRIPTION OF EMBODIMENTS

The following gives a more detailed description of implementations of this application with reference to accompanying drawings and embodiments. The detailed description of the following embodiments and the accompanying drawings are intended to exemplarily describe the principles of this application, but not to limit the scope of this application. Therefore, this application is not limited to the described embodiments.

In the description of this application, unless otherwise specified, "a plurality of" means two or more; the terms such as "upper", "lower", "left", "right", "inner", and "outer" indicating a direction or a position relationship are merely intended for ease or brevity of description of this application, but do not indicate or imply that the device or component referred to must be located in the specified direction or constructed or operated in the specified direction. Therefore, such terms shall not be understood as a limitation on this application. In addition, the terms "first", "second", and "third" are merely intended for descriptive purposes, but are not intended to indicate or imply relative importance. "Perpendicular" is not exactly perpendicular, but within an error tolerance range. "Parallel" is not exactly parallel, but within an error tolerance range.

The directional terms appearing in the following description indicate the directions shown in the drawings, but are not intended to limit specific structures in this application. In the context of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

Figure 2:
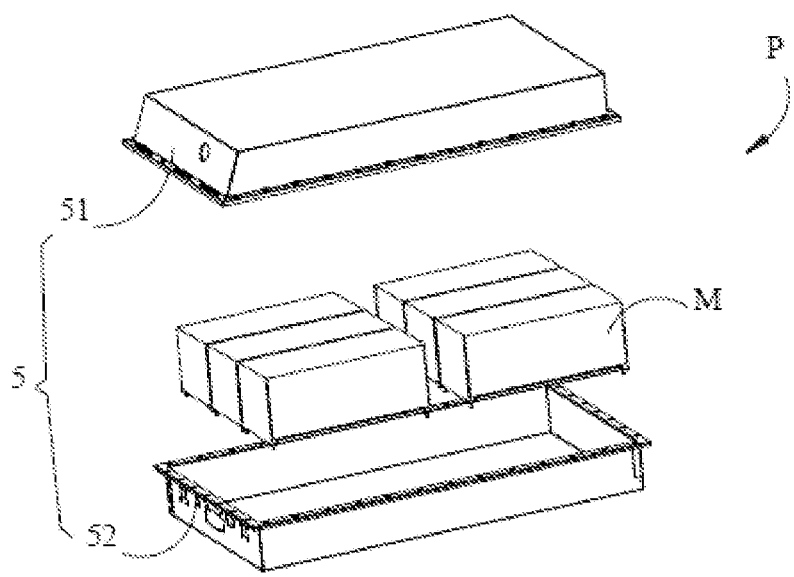
FIG. 2 is a schematic exploded view of a battery pack according to an embodiment of this application.
Figure 3:
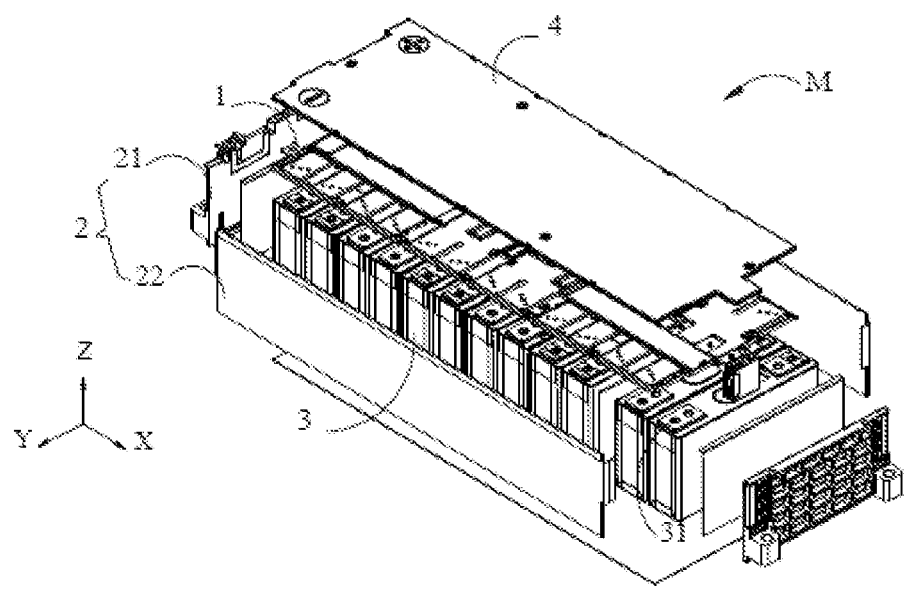
FIG. 3 is a schematic exploded view of a battery module according to an embodiment of this application.

As shown in FIG. 1 to FIG. 3, an embodiment of this application provides a device that uses a battery cell as a power supply. The device may be a mobile device such as a vehicle, a ship, or a small aircraft. The device includes a power source, and the power source is used to provide a driving force for the device. The power supply may be configured as a battery module M that provides electrical energy to the power source. The driving force of the device may be sole electrical energy, or may include electrical energy and other types of energy (such as mechanical energy). The power source may be a battery module M (or a battery pack P), or may be a combination of a battery module M (or battery pack P) and an engine, or the like. Therefore, all devices that can use a battery cell 3 as a power supply fall within the protection scope of this application.

Using a vehicle as an example, a vehicle according to an embodiment of this application may be a new energy vehicle. The new energy vehicle may be a battery electric vehicle, or may be a hybrid electric vehicle, a range-extended electric vehicle, or the like. The vehicle may include a battery pack P and a vehicle body. The battery pack P is disposed in the vehicle body. A driving motor is further disposed in the vehicle body, and the driving motor is electrically connected to the battery pack P. The battery pack P provides electrical energy. The driving motor is connected to wheels of the vehicle body through a transmission mechanism to drive the vehicle to run. Specifically, the battery pack P may be horizontally disposed at a bottom of the vehicle body.

As shown in FIG. 2, a battery pack P according to this embodiment includes a box body 5 and a battery module M disposed in the box body 5. The box body 5 may be made of aluminum, an aluminum alloy or another metal material. The box body 5 includes an accommodation cavity. In a possible design, the box body 5 includes an upper box 51 and a lower box 52. The upper box 51 fits the lower box 52 to form the accommodation cavity. One battery module M or at least two battery modules M may be accommodated in the accommodation cavity. Each battery module M is fixed to the box body 5.

As shown in FIG. 3, an embodiment of this application provides a battery module M, including a connecting assembly 1, a module frame 2, a battery cell 3, and an upper cover plate 4. The module frame 2 may include an end plate 21 and a side plate 22. The end plate 21 and the side plate 22 define an accommodation space. There may be a plurality of battery cells 3. The plurality of battery cells 3 are stacked alongside each other in the accommodation space defined by the module frame 2. The battery cell 3 may be a secondary battery that is rechargeable. The battery cell 3 according to this embodiment includes an electrode lead 31. Specifically, each battery cell 3 includes two electrode leads 31 of opposite polarities, that is, a positive electrode lead and a negative electrode lead. Along a height direction Z of the battery module M, the connecting assembly 1 is disposed above a position where the electrode lead 31 of the battery cell 3 is located, and is located between the upper cover plate 4 and the battery cell 3. The upper cover plate 4 is connected to the module frame 2 or the connecting assembly 1 to cover the plurality of battery cells 3 and the connecting assembly 1 to serve an insulation function.

Figure 4:
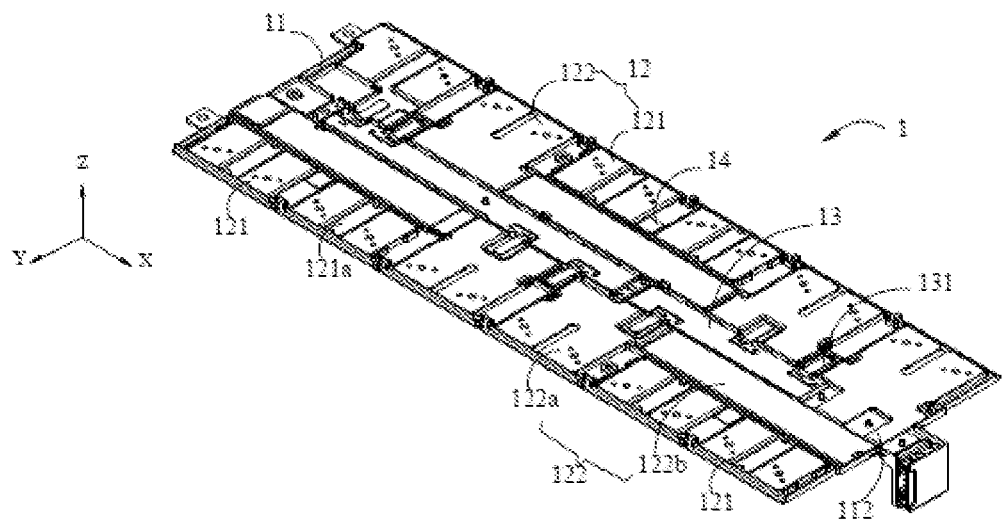
FIG. 4 is a schematic structural diagram of a connecting assembly according to an embodiment of this application.

As shown in FIG. 4, the connecting assembly 1 according to this embodiment of this application includes an insulation board 11 and a busbar 12. The busbar 12 is fixed onto the insulation board 11 to form the connecting assembly 1. The busbar 12 is configured to connect to the electrode lead 31 of the battery cell 3, so that the plurality of battery cells 3 are connected by the busbar 12 in series and/or in parallel.

Figure 5:
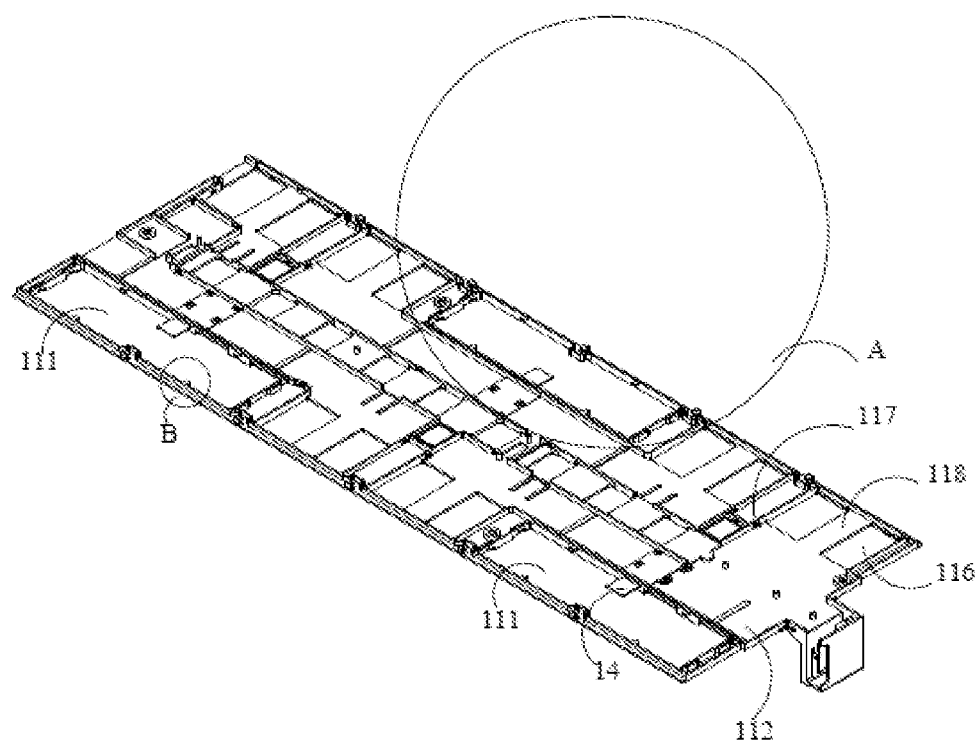
FIG. 5 is a schematic structural diagram of an insulation board from a perspective according to an embodiment of this application.
Figure 8:
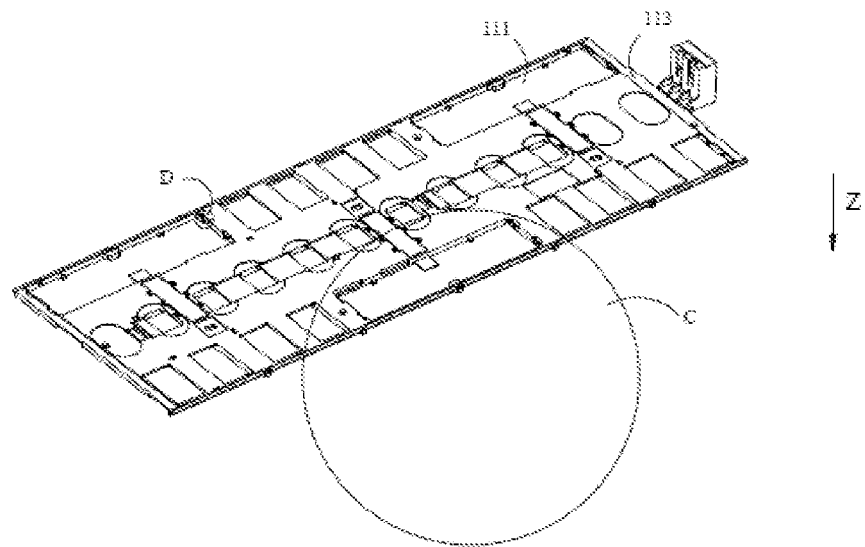
FIG. 8 is a schematic structural diagram of an insulation board from another perspective according to an embodiment of this application.
Figure 9:
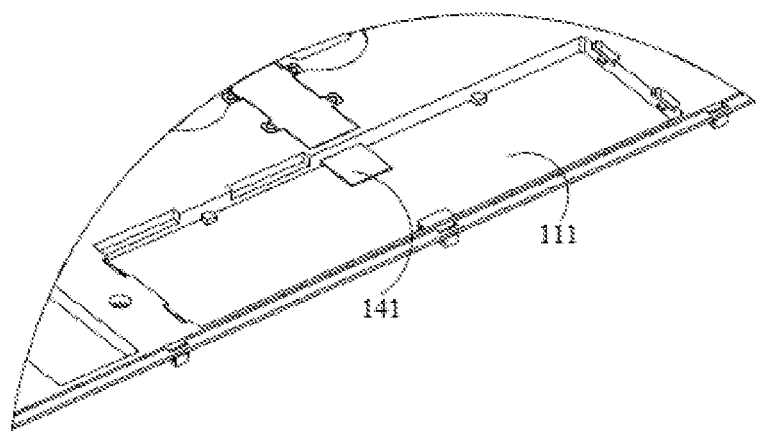
FIG. 9 is a local detailed view of part C shown in FIG. 8 according to an embodiment of this application.

As shown in FIG. 4, FIG. 5, and FIG. 8, the insulation board 11 includes a first side 112 and a second side 113. During invention and creation, the inventor finds that: when all busbars 12 are fixed on one side of the insulation board 11 (the first side 112 shown in FIG. 4 or the second side 113 shown in FIG. 8), the busbars 12 differ from the insulation board 11 in weight. Therefore, in a transport process and in a process of connecting to the battery cell 3, shake usually occurs due to a large mass difference between different parts of the connecting assembly 1. The shake is likely to damage the connecting assembly. Therefore, a solution is to place the busbars 12 on the two sides of the insulation board 11 (the first side 112 shown in FIG. 4 and the second side 113 shown in FIG. 8) respectively to form a sandwich structure to improve stability of the connecting assembly 1. However, this solution increases an overall size of the connecting assembly 1, and is adverse to increase of an energy density of the battery module M.

In view of the foregoing problem, the inventor further improves the structure. As shown in FIG. 4 and FIG. 5, the insulation board 11 further includes a hollow portion 111, and the busbar 12 includes a first busbar 122 and a second busbar 121. The first busbar 122 is disposed on the first side 112 of the insulation board 11. The second busbar 121 is disposed from the second side 113 into the hollow portion 111 of the insulation board 11. Specifically, the first busbar 122 is installed on the first side 112 of the insulation board 11 from top to bottom, and the second busbar 121 is installed in the hollow portion 111 of the insulation board 11 from bottom to top.

Because the first busbar 122 and the second busbar 121 are disposed on different sides, the acting force on the first busbar 122 counteracts the acting force on the second busbar 121, thereby reducing the shake of the assembly and being highly shockproof. In addition, the second busbar 121 is accommodated in the hollow portion 111 of the insulation board 11, thereby reducing both the weight of the connecting assembly 1 and the thickness of the connecting assembly 1, and increasing the energy density of the battery module M.

Further, the connecting assembly 1 may include a circuit board 13. Specifically, the circuit board 13 may be an FPC, a PCB, or the like. The circuit board 13 further includes a plurality of sampling pins 131. The sampling pins 131 are connected to the busbar 12 to sample and transmit data such as voltage and temperature of the battery cell 3. The circuit board 13 may be bonded and fixed to the insulation board 11 to form the connecting assembly 1, or may be fixed to the insulation board 11 by means of a hot-melt rivet or the like.

The first busbar 122 and the second busbar 121 are located at different positions. Therefore, after the sampling pin 131 and the first busbar 122 are connected (specifically, by means of welding, riveting, or the like) on the first side 112, the connecting needs to be performed for a second time on the second side 113. The connecting steps are complicated and difficult to perform. If two circuit boards 13 are disposed on the first side 112 and the second side 113 of the insulation board respectively, the sampling precision will be reduced, and it is not convenient to connect sampling connection wires. Therefore, the circuit board 13 is disposed on the first side 112 of the connecting assembly 1, and the circuit board 13 is connected to a plurality of sampling pins 131. The plurality of sampling pins 131 are connected to the first busbar 122 and the second busbar 121 respectively (that is, among the plurality of sampling pins 131, a part of the sampling pins 131 are connected to the first busbar 122, and another part of the sampling pins 131 are connected to the second busbar 121). By reducing the quantity of the circuit board 13, this solution improves the sampling precision of a sampling control system and simplifies the connection of the sampling connection wires.

As shown in FIG. 4, the first busbar 122 and the second busbar 121 are arranged alternately. In addition, the first busbar 122 and the second busbar 121 do not interfere with each other. To be specific, intervals exist in a length direction X, a width direction Y, and a thickness direction Z of the insulation board 11 to prevent the first busbar 122 from contacting the second busbar 121, thereby reducing the risk of short circuits and improving the safety performance of the battery module M.

Further, as shown in FIG. 4, the first busbar 122 includes a first busbar body 122a and a busbar extension 122b that are connected to each other. The busbar extension 122b is approximately perpendicular to the first busbar body 122a. The first busbar body 122a is connected to the sampling pin 131. The sampling pin 131 connects the circuit board 13 to the busbar 12. Alternatively, the circuit board 13 may be connected to the busbar extension 122b by the sampling pin 131. The busbar extension 122b is located between the second busbar 121 and the circuit board 13, and the busbar extension 122b does not interfere with the second busbar 121. To be specific, intervals exist in the length direction X, the width direction Y, and the thickness direction Z of the insulation board 11 to prevent the second busbar 121 from contacting the busbar extension 122b, thereby reducing the risk of short circuits of the connecting assembly 1. However, when the sampling pin 131 on the circuit board 13 is connected to the second busbar 121, because the busbar extension 122b of the first busbar 122 is located between the circuit board 13 and the second busbar 121, if the sampling pin 131 is directly connected to the second busbar 121, the sampling pin 131 may become connected to the busbar extension 122b, thereby leading to incorrect sample values taken from the second busbar 121.

As shown in FIG. 4, the first busbars 122 are disposed alternately between the second busbar 121 and the circuit board 13, so that the circuit board 13 is unable to accurately sample the second busbar 121. Therefore, further, a connecting piece 14 needs to be disposed. At least a part of the connecting piece 14 is embedded into the insulation board 11. The second busbar 121 is connected to the sampling pin 131 by the connecting piece 14. The connecting piece 14 connects the second busbar 121 to the sampling pin 131, thereby solving the problem of inability of sampling a remote busbar 12, and ensuring proper risk control during the sampling. In addition, it is ensured that the connecting piece 14 connected to the second busbar 121 and the sampling pin 131 connected to the first busbar 122 are all located on the first side 112. The foregoing connecting process is performed at just one processing work station, thereby facilitating the connecting process. Alternatively, the connecting piece 14 may be disposed without interfering with the first busbar 122, and at least a part of the connecting piece 14 is embedded into the insulation board 11 to improve stability of a sampling structure.

Figure 6:
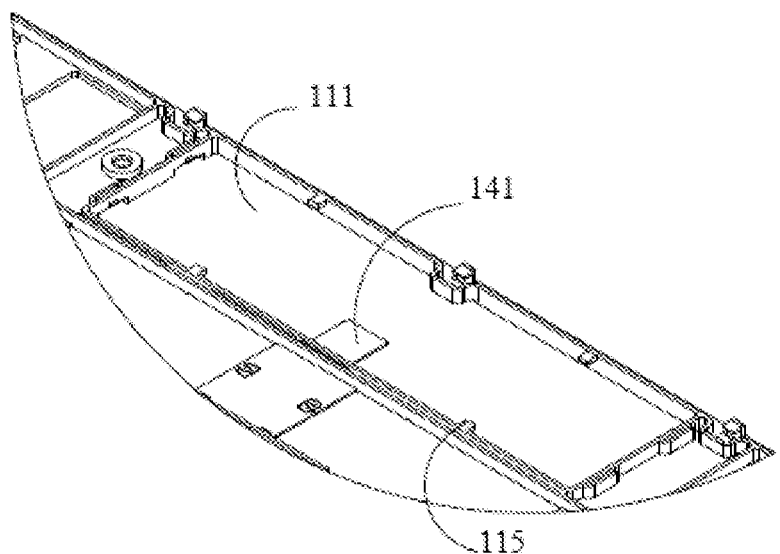
FIG. 6 is a local detailed view of part A shown in FIG. 5 according to an embodiment of this application.
Figure 7:
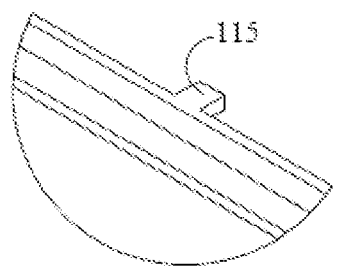
FIG. 7 is a local detailed view of part B shown in FIG. 5 according to an embodiment of this application.
Figure 14:
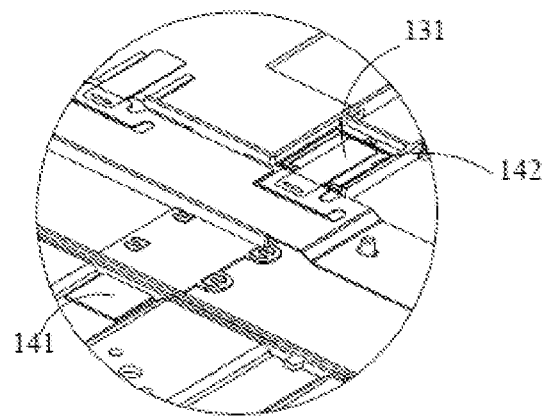
FIG. 14 is a local detailed view of part F shown in FIG. 13 according to an embodiment of this application.

In practice, when the first busbar 122 and the second busbar 121 are disposed on the same side of the insulation board 11, it is prone to short circuits and leading to a non-conformity creepage distance between a first busbar 122 and a second busbar 121 that are adjacent to each other. In contrast, in the embodiments of this application, as shown in FIG. 4, FIG. 6, and FIG. 14, the connecting piece 14 includes a first extension 141, an inset (not marked with a reference numeral in the drawing), and a second extension 142. The inset is connected to the first extension 141 and the second extension 142, and is embedded in the insulation board 11. The first extension 141 is located in the hollow portion 111. The first extension 141 is connected to a surface of the second busbar 121, the surface being close to the first side 112. The first extension 141 extends to the hollow portion 111 and is configured to connect to the second busbar 121. The second extension 142 is configured to connect to the sampling pin 131. Therefore, the second busbar 121 can conduct current through the connecting piece 14 to the sampling pin 131, thereby solving the problem of inability of sampling the remote busbar 12 and reducing the risk of short circuits of the connecting assembly 1.

The connecting piece 14 and the insulation board 11 are made of highly compatible insulation materials to prevent the connecting piece 14 from detaching during a life cycle and ensure that the structural strength, voltage withstand strength, and insulation performance meet requirements.

Figure 10:
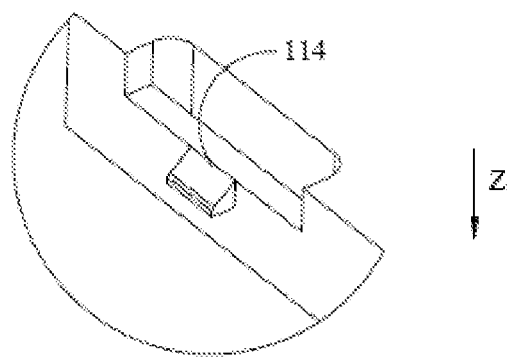
FIG. 10 is a local detailed view of part D shown in FIG. 8 according to an embodiment of this application.
Figure 11:
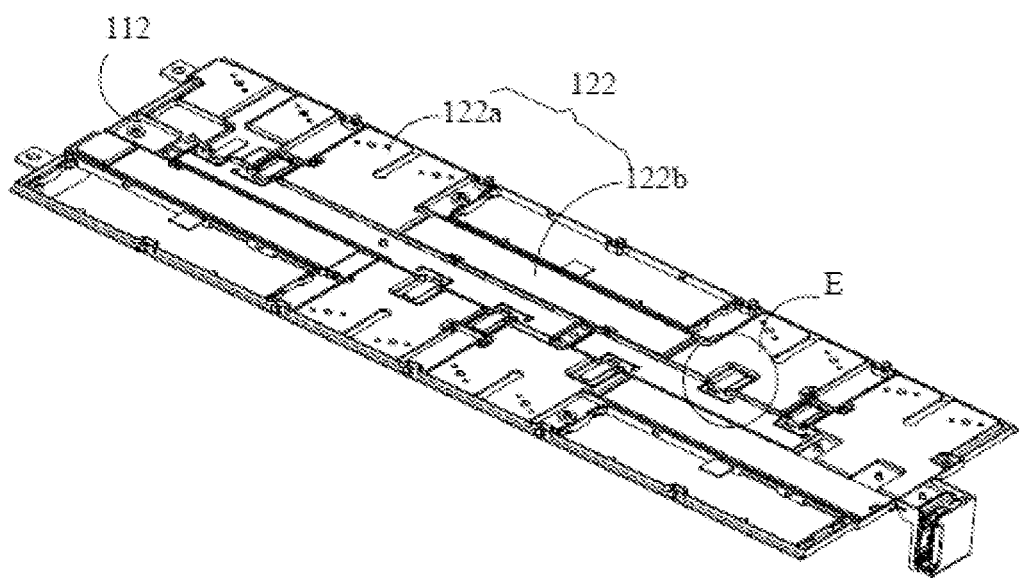
FIG. 11 is a schematic structural diagram of a first busbar installed on an insulation board according to an embodiment of this application.
Figure 12:
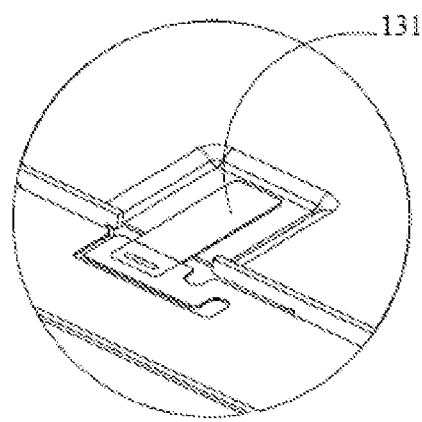
FIG. 12 is a local detailed view of part E shown in FIG. 11 according to an embodiment of this application.
Figure 13:
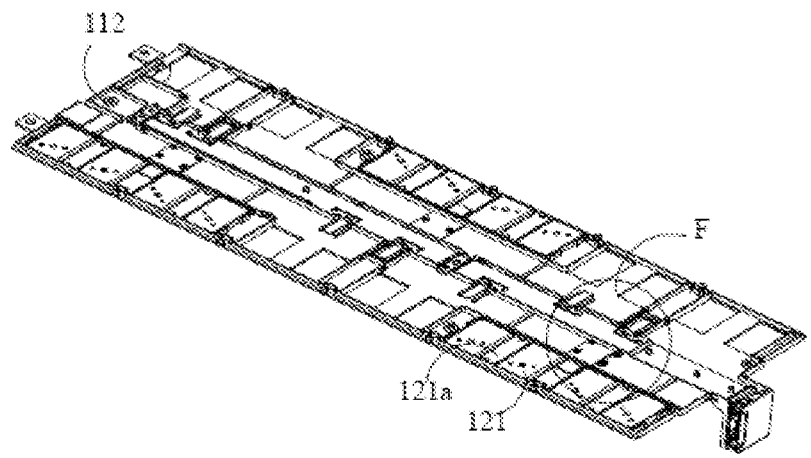
FIG. 13 is a schematic structural diagram of a second busbar installed on an insulation board according to an embodiment of this application.

As shown in FIG. 6, FIG. 8, and FIG. 10, a first snap-fit portion 114 and a first prop 115 are disposed in the hollow portion 111. The first snap-fit portion 114 is located in the hollow portion 111 and away from the first side 112. The first prop 115 is located in the hollow portion 111 and close to the first side 112. The second busbar 121 is located between the first snap-fit portion 114 and the first prop 115. The second busbar 121 is installed from bottom to top in the thickness direction Z of the insulation board 11, passes through the first snap-fit portion 114 first, and then abuts against the first prop 115. To be specific, an upper surface of the second busbar 121 abuts against a lower surface of the first prop 115, and a lower surface of the second busbar 121 abuts against an upper surface of the first snap-fit portion 114. In this way, the second busbar 121 is fixed onto the insulation board 11 to prevent the second busbar 121 from falling off from insulation board 11.

Specifically, as shown in FIG. 4, a recess 121a is disposed on the second busbar 121, and the first prop 115 abuts against the recess 121a. The recess 121a makes the entire second busbar 121 be located on the insulation board 11.

Further, as shown in FIG. 10, a side of the first snap-fit portion 114, the side that is away from the second busbar in the thickness direction Z of the insulation board 11, is a sloping side. This facilitates installation of the second busbar 121 when the second busbar 121 is installed from bottom to top in the thickness direction Z of the insulation board 11.

As shown in FIG. 5, communicating holes 116, a second snap-fit portion 117, and a second prop 118 are disposed on the insulation board 11. The second prop 118 partitions the hollow portion 111 to form a plurality of communicating holes 116. The second snap-fit portion 117 is disposed on the first side 112. The first busbar 122 is located between the second snap-fit portion 117 and the second prop 118. The first busbar 122 is installed from top to bottom in the thickness direction Z of the insulation board 11. The first busbar 122 is fixed onto the upper surface of the insulation board 11 by the second snap-fit portion 117 and the second prop 118 to prevent the first busbar 122 from falling off from the insulation board 11.

An embodiment of this application provides a method for manufacturing a connecting assembly, including: installing a first busbar 122 onto a first side 112 of an insulation board 11 from top to bottom in a thickness direction Z of the insulation board 11; and installing a second busbar 121 into a hollow portion 111 of the insulation board 11 from bottom to top in the thickness direction Z of the insulation board 11.

Further, in the thickness direction Z of the insulation board 11, a circuit board 13 equipped with sampling pins 131 is installed on the first side 112 of the insulation board 11 from top to bottom, and the first busbar 122 is connected to a part of the sampling pins 131.

When a connecting piece 14 is disposed on the connecting assembly, the connecting piece 14 is embedded into the insulation board 11 to form an inset, a first extension 141, and a second extension 142. The second busbar 121 is connected to the first extension 141. Another part of the sampling pins 131 are connected to the second extension 142.

To improve manufacturing efficiency, specifically, a method for manufacturing a connecting assembly is:

embedding a connecting piece 14 into an insulation board 11 to form an inset, a first extension 141, and a second extension 142;

installing a first busbar 122 onto a first side 112 of the insulation board 11 from top to bottom in a thickness direction Z of the insulation board 11; and installing a second busbar 121 into a hollow portion 111 of the insulation board 11 from bottom to top in the thickness direction Z of the insulation board 11;

installing, to the first side 112 of the insulation board 11 from top to bottom, a circuit board 13 equipped with sampling pins 131; and connecting a part of the sampling pins 131 to the first busbar 122; connecting another part of the sampling pins 131 to the second extension 142; and connecting the first extension 141 to the second busbar 121.

In conclusion, in this embodiment of this application, the first busbar 122 is installed on the first side 112 of the insulation board 11 from top to bottom, and the second busbar 121 is installed on the hollow portion 111 of the insulation board 11 from bottom to top. Because the first busbar 122 and the second busbar 121 are disposed on different sides, the acting force on the first busbar 122 counteracts the acting force on the second busbar 121, thereby reducing the shake of the assembly and being highly shockproof. In addition, the second busbar 121 is accommodated in the hollow portion 111 of the insulation board 11, thereby reducing both the weight of the connecting assembly 1 and the thickness of the connecting assembly 1, and increasing the energy density of the battery module M. The first busbar 122 is welded to a part of the sampling pins 131, and the second busbar 121 is welded to the first extension 141. In this way, the first busbar 122 and the second busbar 121 can be welded on the same side. Therefore, just one processing work station is needed for welding the first busbar 122 and the second busbar 121 to the circuit board 13, thereby facilitating the welding.

Although this application has been described with reference to exemplary embodiments, various improvements may be made to the embodiments without departing from the scope of this application, and the parts therein may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. A connecting assembly for a battery module, comprising:
    an insulation board, wherein the insulation board comprises a first surface, a second surface vertically opposite to the first surface, and a hollow portion extending from the first surface to the second surface;
    a first busbar disposed on the first surface of the insulation board, the first busbar comprising a first busbar body and a busbar extension connected to the first busbar body, wherein the busbar extension is approximately perpendicular to the first busbar body;
    a second busbar disposed from the second surface into the hollow portion of the insulation board;
    a circuit board disposed on the first surface of the insulating board, wherein the busbar extension of the first busbar is located between the second busbar and the circuit board, and wherein the circuit board comprises a plurality of sampling pins disposed on the first surface and directly connected to the first busbar; and
    a connecting piece connecting the plurality of sampling pins and the second busbar, wherein at least a part of the connecting piece is embedded into the insulation board.

2. The connecting assembly according to claim 1, wherein the connecting piece comprises a first extension, an inset, and a second extension, the inset is connected to the first extension and the second extension, and is embedded in the insulation board, the first extension is located in the hollow portion, and the first extension is connected to a surface of the second busbar, the surface being close to the first surface.

3. The connecting assembly according to claim 1, further comprising a first snap-fit portion and a first prop disposed in the hollow portion, wherein the first snap-fit portion is located in the hollow portion away from the first surface, and the first prop is located in the hollow portion near the first surface, and wherein the second busbar is located between the first snap-fit portion and the first prop.

4. The connecting assembly according to claim 3, wherein the second busbar further comprises a recess disposed on the second busbar; and
   wherein the first prop is configured to abut against the recess.

5. The connecting assembly according to claim 3, wherein the first snap-fit portion comprises a side away from the second busbar and sloping in a thickness direction of the insulation board.

6. The connecting assembly according to claim 1, further comprising a second snap-fit portion disposed on the first surface and a second prop disposed on the insulation board, wherein the second prop is configured to partition the hollow portion to form a plurality of communicating holes, and wherein the first busbar is located between the second snap-fit portion and the second prop.

7. A battery module, comprising a battery cell and a module frame, wherein the battery cell is accommodated in the module frame;
   wherein the battery module further comprises a connecting assembly and the connecting assembly comprises:
   an insulation board, wherein the insulation board comprises a first surface, a second surface vertically opposite to the first surface, and a hollow portion extending from the first surface to the second surface;
   a first busbar disposed on the first surface of the insulation board, the first busbar comprising a first busbar body and a busbar extension connected to the first busbar body, wherein the busbar extension is approximately perpendicular to the first busbar body;
   a second busbar disposed from the second surface into the hollow portion of the insulation board;
   a circuit board disposed on the first surface of the insulating board, wherein the busbar extension of the first busbar is located between the second busbar and the circuit board, and wherein the circuit board comprises a plurality of sampling pins disposed on the first surface and directly connected to the first busbar; and
   a connecting piece connecting the plurality of sampling pins and the second busbar, wherein at least a part of the connecting piece is embedded into the insulation board.

8. A device using a battery cell as a power supply, comprising:
   a power source, wherein the power source is configured to provide a driving force for the device; and
   a battery module configured to provide electrical energy to the power source, wherein the battery module comprises a battery cell and a module frame, and the battery cell is accommodated in the module frame;
   wherein the battery module further comprises a connecting assembly, and the connecting assembly comprises:
   an insulation board, wherein the insulation board comprises a first surface, a second surface vertically opposite to the first surface, and a hollow portion extending from the first surface to the second surface;
   a first busbar disposed on the first surface of the insulation board, the first busbar comprising a first busbar body and a busbar extension connected to the first busbar body, wherein the busbar extension is approximately perpendicular to the first busbar body;
   a second busbar disposed from the second surface into the hollow portion of the insulation board;
   a circuit board disposed on the first surface of the insulating board, wherein the busbar extension of the first busbar is located between the second busbar and the circuit board, and wherein the circuit board comprises a plurality of sampling pins disposed on the first surface and directly connected to the first busbar; and
   a connecting piece connecting the plurality of sampling pins and the second busbar, wherein at least a part of the connecting piece is embedded into the insulation board.

* * * * *